United States Patent
Lv et al.

(10) Patent No.: US 10,903,896 B2
(45) Date of Patent: Jan. 26, 2021

(54) NETWORK COMMUNICATION METHOD AND NETWORK COMMUNICATIONS APPARATUS

(71) Applicant: Huawei Technologies Co., Ltd., Shenzhen (CN)

(72) Inventors: Linjun Lv, Shenzhen (CN); Rong Wang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 184 days.

(21) Appl. No.: 16/052,153

(22) Filed: Aug. 1, 2018

(65) Prior Publication Data
US 2018/0343052 A1    Nov. 29, 2018

Related U.S. Application Data

(63) Continuation of application No. PCT/CN2016/089825, filed on Jul. 12, 2016.

(30) Foreign Application Priority Data

Feb. 2, 2016    (CN) .......................... 2016 1 0072514

(51) Int. Cl.
*H04B 7/185*    (2006.01)
*H04W 4/38*    (2018.01)
(Continued)

(52) U.S. Cl.
CPC ..... *H04B 7/18513* (2013.01); *H04B 7/18504* (2013.01); *H04W 4/025* (2013.01);
(Continued)

(58) Field of Classification Search
CPC .. H04B 7/18513; H04W 4/025; H04W 48/18; H04W 68/005
See application file for complete search history.

(56) References Cited

U.S. PATENT DOCUMENTS

| 6,868,314 | B1 | 3/2005 | Frink |
| 2013/0177321 | A1 | 7/2013 | Devaul et al. |
| 2015/0236778 | A1 | 8/2015 | Jalali et al. |

FOREIGN PATENT DOCUMENTS

| CN | 101060362 A | 10/2007 |
| CN | 102611200 A | 7/2012 |

(Continued)

OTHER PUBLICATIONS

Foreign Communication From a Counterpart Application, European Application No. 16889003.6, Partial Supplementary European Search Report dated Oct. 19, 2018, 13 pages.
(Continued)

*Primary Examiner* — Rhonda L Murphy
(74) *Attorney, Agent, or Firm* — Conley Rose, P.C.

(57) ABSTRACT

A network communication method and a network communications apparatus where the method is applied to an over-the-air network system, and the over-the-air network system includes a service processing device and a level-1 over-the-air network node. The method includes generating, by the service processing device, a collection instruction, where the collection instruction includes a preset collection rule, the preset collection rule is used to instruct the level-1 over-the-air network node to collect, according to the preset collection rule, service data reported by a terminal in a target area, and the target area is an area covered by the level-1 over-the-air network node; sending, by the service processing device, the collection instruction to the level-1 over-the-air network node; and collecting, by the level-1 over-the-air network node according to the preset collection rule in the collection instruction, the service data reported by the terminal in the target area.

20 Claims, 11 Drawing Sheets

(51) Int. Cl.

| | | |
|---|---|---|
| *H04W 4/02* | (2018.01) | |
| *H04W 48/18* | (2009.01) | |
| *H04W 68/00* | (2009.01) | |
| *G08G 5/00* | (2006.01) | |
| *H04L 29/08* | (2006.01) | |
| *H04W 4/021* | (2018.01) | |
| *H04W 84/00* | (2009.01) | |
| *H04W 84/06* | (2009.01) | |

(52) U.S. Cl.
CPC ............ *H04W 4/38* (2018.02); *H04W 48/18* (2013.01); *H04W 68/005* (2013.01); *G08G 5/0069* (2013.01); *H04B 7/18563* (2013.01); *H04L 67/125* (2013.01); *H04W 4/021* (2013.01); *H04W 84/005* (2013.01); *H04W 84/06* (2013.01)

(56) References Cited

FOREIGN PATENT DOCUMENTS

| | | | |
|---|---|---|---|
| CN | 102752716 | A | 10/2012 |
| CN | 103313259 | A | 9/2013 |
| CN | 103313342 | A | 9/2013 |
| CN | 104049625 | A | 9/2014 |
| CN | 104160639 | A | 11/2014 |
| CN | 204154914 | U | 2/2015 |
| CN | 104503462 | A | 4/2015 |
| EP | 0762669 | A2 | 3/1997 |
| EP | 0774843 | A2 | 5/1997 |
| EP | 2945412 | A2 | 11/2015 |
| WO | 2015073687 | A1 | 5/2015 |
| WO | WO-2015073687 | A1 * | 5/2015 ......... E21B 47/0007 |

OTHER PUBLICATIONS

Machine Translation and Abstract of Chinese Publication No. CN101060362, Oct. 24, 2007, 12 pages.
Machine Translation and Abstract of Chinese Publication No. CN102611200, Jul. 25, 2012, 16 pages.
Machine Translation and Abstract of Chinese Publication No. CN102752716, Oct. 24, 2012, 11 pages.
Machine Translation and Abstract of Chinese Publication No. CN103313259, Sep. 18, 2013, 12 pages.
Machine Translation and Abstract of Chinese Publication No. CN103313342, Sep. 18, 2013, 12 pages.
Machine Translation and Abstract of Chinese Publication No. CN104049625, Sep. 17, 2014, 14 pages.
Machine Translation and Abstract of Chinese Publication No. CN104503462, Apr. 8, 2015, 7 pages.
Machine Translation and Abstract of Chinese Publication No. CN204154914, Feb. 11, 2015, 13 pages.
Foreign Communication From a Counterpart Application, PCT Application No. PCT/CN2016/089825, English Translation of International Search Report dated Oct. 26, 2016, 2 pages.
Foreign Communication From a Counterpart Application, PCT Application No. PCT/CN2016/089825, English Translation of Written Opinion dated Oct. 26, 2016, 4 pages.
Foreign Communication From a Counterpart Application, European Application No. 16889003.6, Extended European Search Report dated Feb. 14, 2019, 12 pages.

\* cited by examiner

NETWORK COMMUNICATION METHOD AND NETWORK COMMUNICATIONS APPARATUS

CROSS-REFERENCE TO RELATED APPLICATIONS

This application is a continuation of International Patent Application No. PCT/CN2016/089825 filed on Jul. 12, 2016, which claims priority to Chinese Patent Application No. 201610072514.7 filed on Feb. 2, 2016, both of which are hereby incorporated by reference in their entireties.

TECHNICAL FIELD

This application relates to the field of communications technologies, and in particular, to a network communication method and a network communications apparatus.

BACKGROUND

With popularization of the Internet, more devices are connected to networks. Existing networks are mainly communications networks such as a cellular network and a Wireless Local Area Network (WLAN). On these networks, many base stations or hotspots need to be deployed between communications devices to serve as signal repeaters, so that signals can be transmitted between communications devices that are far away from each other. For machine-to-machine (M2M) services most of which are logistics services, these networks cannot be used in many scenarios. For example, for a cargo ship in an ocean far away from the land, a state of a cargo in the cargo ship needs to be monitored in real time. In this case, because it is impossible to deploy a base station or a hotspot in the ocean, data related to the state of the cargo cannot be sent to a recipient using a base station or a hotspot. In other approaches, M2M service data is usually transmitted using a satellite. However, usage costs of a satellite are very high, and a satellite cannot be flexibly deployed because an orbit of the satellite is fixed. Therefore, there are communication coverage holes. Consequently, M2M service data cannot be transmitted in many areas using a satellite.

Therefore, a network communication method is needed to meet an M2M service requirement.

SUMMARY

Embodiments of this application provide a network communication method and a network communications apparatus, to collect service data using an over-the-air network system and meet an M2M service requirement.

An embodiment of this application provides a network communication method, where the method is applied to an over-the-air network system, the over-the-air network system includes a service processing device and a level-1 over-the-air network node, and the method includes generating, by the service processing device, a collection instruction, where the collection instruction includes a preset collection rule, the preset collection rule is used to instruct the level-1 over-the-air network node to collect, according to the preset collection rule, service data reported by a terminal in a target area, and the target area is an area covered by the level-1 over-the-air network node; sending, by the service processing device, the collection instruction to the level-1 over-the-air network node; and collecting, by the level-1 over-the-air network node according to the preset collection rule in the collection instruction, the service data reported by the terminal in the target area.

According to the method provided in this embodiment of this application, the level-1 over-the-air network node in the air collects the service data reported by the terminal in the target area, to avoid high costs caused by service data collection performed by a satellite. In addition, a problem that the service data reported by the terminal in the target area cannot be obtained when the target area is in a coverage hole of the satellite can be avoided, thereby meeting an M2M service requirement.

Optionally, the preset collection rule includes a scanning route; and the collecting, by the level-1 over-the-air network node according to the preset collection rule in the collection instruction, the service data reported by the terminal in the target area includes scanning, by the level-1 over-the-air network node, the target area according to the scanning route; and collecting the service data reported by the terminal obtained by scanning.

By means of the foregoing method, the level-1 over-the-air network node can collect the service data reported by the terminal in the target area beyond signal coverage of the level-1 over-the-air network node, thereby improving resource utilization.

Optionally, the preset collection rule includes a scanning location and a scanning height; and the collecting, by the level-1 over-the-air network node according to the preset collection rule in the collection instruction, the service data reported by the terminal in the target area includes moving, by the level-1 over-the-air network node, to the scanning location and the scanning height; and scanning the target area and collecting the service data reported by the terminal obtained by scanning.

Optionally, the preset collection rule includes a scanning time interval; and the collecting, by the level-1 over-the-air network node according to the preset collection rule in the collection instruction, the service data reported by the terminal in the target area includes scanning, by the level-1 over-the-air network node, the target area according to the scanning time interval; and collecting the service data reported by the terminal obtained by scanning.

Optionally, after the collecting, by the level-1 over-the-air network node according to the preset collection rule in the collection instruction, the service data reported by the terminal in the target area, the method further includes sending, by the level-1 over-the-air network node, a scanning complete acknowledgement message to the service processing device, to indicate, to the service processing device, that the level-1 over-the-air network node has collected the service data reported by the terminal in the target area; after receiving the scanning complete acknowledgement message, sending, by the service processing device, a service data request message to the level-1 over-the-air network node, to instruct the level-1 over-the-air network node to send the service data to the service processing device; and receiving, by the level-1 over-the-air network node, the service data request message sent by the service processing device; and sending, to the service processing device according to the service data request message, the collected service data reported by the terminal in the target area.

Optionally, the sending, by the service processing device, a service data request message to the level-1 over-the-air network node includes if determining that a communications link between the service processing device and the level-1 over-the-air network node is in a disconnected state, sending, by the service processing device, a movement control instruction to the level-1 over-the-air network node using a satellite, where the movement control instruction is used to instruct the level-1 over-the-air network node to move to a location whose distance to the service processing device is within a preset distance, and recover the communications link between the service processing device and the level-1 over-the-air network node; and after determining that the level-1 over-the-air network node moves, according to the movement control instruction, to the location whose distance to the service processing device is within the preset distance and recovers the communications link, sending, by the service processing device, the service data request message to the level-1 over-the-air network node using the communications link, where the preset distance is a minimum value of a signal coverage radius of the service processing device and a signal coverage radius of the level-1 over-the-air network node; and the sending, by the level-1 over-the-air network node to the service processing device according to the service data request message, the collected service data reported by the terminal in the target area includes sending, by the level-1 over-the-air network node to the service processing device using the communications link, the collected service data reported by the terminal in the target area.

By means of the foregoing method, it can be avoided that when the communications link between the service processing device and the level-1 over-the-air network node is in the disconnected state, the level-1 over-the-air network node sends the service data to the service processing device using a satellite may be avoided, thereby reducing a delay caused because the service data is sent using the satellite, and avoiding high costs required because the service data is sent using the satellite.

An embodiment of this application provides a network communication method, where the method is applied to an over-the-air network system, and the over-the-air network system includes a service processing device, a level-1 over-the-air network node, and a level-2 over-the-air network node, where generating, by the service processing device, a collection instruction, where the collection instruction includes a preset collection rule, the preset collection rule is used to instruct the level-2 over-the-air network node to collect, according to the preset collection rule, service data reported by a terminal in a target area, and the target area is an area covered by the level-2 over-the-air network node; sending, by the service processing device, the collection instruction to the level-1 over-the-air network node; forwarding, by the level-1 over-the-air network node, the collection instruction to the level-2 over-the-air network node; and collecting, by the level-2 over-the-air network node according to the preset collection rule in the collection instruction, the service data reported by the terminal in the target area.

Optionally, the preset collection rule includes a scanning route; and the collecting, by the level-2 over-the-air network node according to the preset collection rule in the collection instruction, the service data reported by the terminal in the target area includes scanning, by the level-2 over-the-air network node, the target area according to the scanning route; and collecting the service data reported by the terminal obtained by scanning.

Optionally, the preset collection rule includes a scanning location and a scanning height; and the collecting, by the level-2 over-the-air network node according to the preset collection rule in the collection instruction, the service data reported by the terminal in the target area includes moving, by the level-2 over-the-air network node, to the scanning location and the scanning height; and scanning the target area and collecting the service data reported by the terminal obtained by scanning.

Optionally, the preset collection rule includes a scanning time interval; and the collecting, by the level-2 over-the-air network node according to the preset collection rule in the collection instruction, the service data reported by the terminal in the target area includes scanning, by the level-2 over-the-air network node, the target area according to the scanning time interval; and collecting the service data reported by the terminal obtained by scanning.

Optionally, after the collecting, by the level-2 over-the-air network node according to the collection instruction, the service data reported by the terminal in the target area, the method further includes sending, by the level-2 over-the-air network node, a scanning complete acknowledgement message to the level-1 over-the-air network node, where the scanning complete acknowledgement message is used to indicate, to the service processing device, that the level-2 over-the-air network node has collected the service data reported by the terminal in the target area; receiving, by the level-1 over-the-air network node, the scanning complete acknowledgement message; and forwarding the scanning complete acknowledgement message to the service processing device; after the service processing device receives the scanning complete acknowledgement message, sending, by the service processing device, a service data request message to the level-1 over-the-air network node, where the service data request message is used to instruct the level-2 over-the-air network node to send the service data to the service processing device; receiving, by the level-1 over-the-air network node, the service data request message sent by the service processing device; and forwarding the service data request message to the level-2 over-the-air network node; and receiving, by the level-2 over-the-air network node, the service data request message forwarded by the level-1 over-the-air network node; and sending, to the service processing device according to the service data request message using the level-1 over-the-air network node, the collected service data reported by the terminal in the target area.

Optionally, the forwarding, by the level-1 over-the-air network node, the service data request message to the level-2 over-the-air network node includes if determining that a communications link between the level-1 over-the-air network node and the level-2 over-the-air network node is in a disconnected state, moving, by the level-1 over-the-air network node, to a location whose distance to the level-2 over-the-air network node is within a preset distance, and recovering the communications link between the level-1 over-the-air network node and the level-2 over-the-air network node; and sending, by the level-1 over-the-air network node, the service data request message to the level-2 over-the-air network node using the communications link, where the preset distance is a minimum value of a signal coverage radius of the level-1 over-the-air network node and a signal coverage radius of the level-2 over-the-air network node; and the sending, by the level-2 over-the-air network node to the service processing device according to the service data request message using the level-1 over-the-air network node, the collected service data reported by the terminal in the target area includes sending, by the level-2 over-the-air network node to the level-1 over-the-air network node using the communications link, the collected service data reported by the terminal in the target area; receiving, by the level-1 over-the-air network node, the service data that is reported by the terminal in the target area and that is sent by the level-2 over-the-air network node; and forwarding, to the service processing device, the service data reported by the terminal in the target area; and receiving, by the service processing device, the service data that is reported by the terminal in the target area and that is forwarded by the level-1 over-the-air network node.

An embodiment of this application provides a network communication method, where the method is applied to an over-the-air network system, the over-the-air network system includes a terminal and an over-the-air network node, and the method includes sending, by the terminal, location information of the terminal to the over-the-air network node, where the over-the-air network node is a level-1 over-the-air network node or a level-2 over-the-air network node; receiving, by the terminal, a satellite parameter sent by the over-the-air network node, where the satellite parameter is used to indicate a satellite corresponding to an area to which the location information belongs; and if determining that a signal strength of the over-the-air network node is less than a threshold, determining, by the terminal according to the satellite parameter, the satellite to be accessed.

According to the method provided in this embodiment of this application, when determining that a signal strength of the over-the-air network node is less than the threshold, the terminal may directly determine, according to the satellite parameter sent by the over-the-air network node, the satellite to be accessed, to avoid a communications delay caused because the terminal actively searches for satellites and selects the satellite that needs to be accessed, thereby increasing a network access speed of the terminal and improving system efficiency.

Optionally, the sending, by the terminal, location information to the over-the-air network node includes when determining that a relative movement distance between the terminal and the over-the-air network node is greater than a preset distance threshold, sending, by the terminal, the location information to the over-the-air network node; or periodically sending, by the terminal, the location information to the over-the-air network node.

An embodiment of this application provides a network communications apparatus, where the apparatus is applied to an over-the-air network system, the over-the-air network system includes a terminal and an over-the-air network node, and the apparatus includes a sending unit configured to send location information of the terminal to the over-the-air network node, where the over-the-air network node is a level-1 over-the-air network node or a level-2 over-the-air network node; a receiving unit configured to receive a satellite parameter sent by the over-the-air network node, where the satellite parameter is used to indicate a satellite corresponding to an area to which the location information belongs; and a determining unit configured to if determining that a signal strength of the over-the-air network node is less than a threshold, determine, according to the satellite parameter, the satellite to be accessed.

Optionally, the sending unit is configured to when determining that a relative movement distance between the terminal and the over-the-air network node is greater than a preset distance threshold, send the location information to the over-the-air network node; or periodically send the location information to the over-the-air network node.

An embodiment of this application provides a network communications apparatus, where the apparatus is applied to an over-the-air network system, the over-the-air network system includes a terminal and an over-the-air network node, and the apparatus includes a transceiver configured to send location information of the terminal to the over-the-air network node, where the over-the-air network node is a level-1 over-the-air network node or a level-2 over-the-air network node; and receive a satellite parameter sent by the over-the-air network node, where the satellite parameter is used to indicate a satellite corresponding to an area to which the location information belongs; and a processor configured to if determining that a signal strength of the over-the-air network node is less than a threshold, determine, according to the satellite parameter, the satellite to be accessed.

Optionally, the transceiver is configured to when determining that a relative movement distance between the terminal and the over-the-air network node is greater than a preset distance threshold, send the location information to the over-the-air network node; or periodically send the location information to the over-the-air network node.

DETAILED DESCRIPTION

In the embodiments of this application, a service processing device may include a wireless transceiver module, a service processing module, a service scheduling module, and the like. The wireless transceiver module may be configured to perform functions such as communicating with a level-1 over-the-air network node, receiving a signal of the level-1 over-the-air network node, and sending a control instruction to the level-1 over-the-air network node. The service processing module may store and process collected service data. The service scheduling module may determine a control instruction that needs to be sent. The service processing device may communicate with the level-1 over-the-air network node using at least one wireless communications technology, for example, a satellite communications technology, a laser communications technology, a visible light communications technology, a mobile communications technology (which supports communications standards such as 2G, 3G, and 4G), a WIFI communications technology, and a BLUETOOTH communications technology. The service processing device may further include a wired transceiver module. The service processing device may be a device such as a base station.

In the embodiments of this application, a terminal may be a wireless terminal. For example, the terminal may be a mobile phone, a computer, a tablet computer, a personal digital assistant (PDA), a mobile Internet device (MID), a wearable device, an Internet Protocol (IP) phone, a network printer, or an e-book reader.

In the embodiments of this application, service data reported by the terminal may be data such as location data, temperature data, and humidity data. This is not limited in the embodiments of this application.

Figure 1:
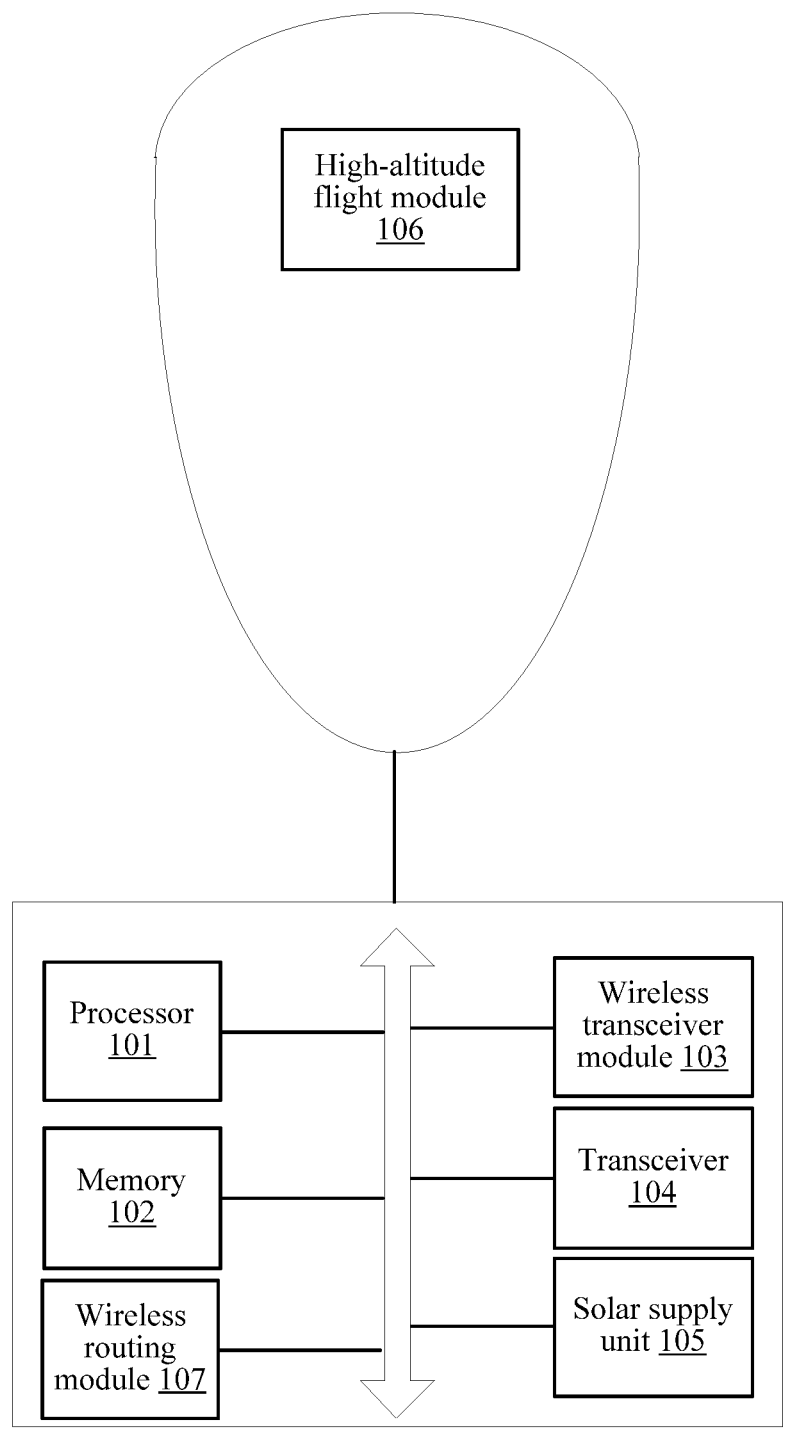
FIG. 1 is a schematic structural diagram of a level-1 over-the-air network node according to an embodiment of this application.

In the embodiments of this application, the level-1 over-the-air network node is a network node that may move in the air. As shown in FIG. 1, FIG. 1 is a schematic structural diagram of a level-1 over-the-air network node according to an embodiment of this application. In FIG. 1, the level-1 over-the-air network node includes a processor 101, a memory 102, a wireless transceiver module 103, a solar supply unit 105, a high-altitude flight module 106, and a wireless routing module 107. The processor 101 may execute an instruction stored in the memory 102, to implement functions such as collecting service data and controlling flight of the high-altitude flight module. The wireless transceiver module 103 in the level-1 over-the-air network node may support at least one wireless communications technology, for example, a satellite communications technology, a laser communications technology, a visible light communications technology, a mobile communications technology, a wireless communications technology, and a BLUETOOTH communications technology. The level-1 over-the-air network node may communicate with a service processing device using the wireless transceiver module. The solar supply unit 105 may convert solar energy into electric energy, to supply power to the level-1 over-the-air network node, or charges a power supply module (not shown in the figure) in the level-1 over-the-air network node. The high-altitude flight module 106 may be a balloon, a motorboat, a drone, or the like. When the high-altitude flight module 106 is a balloon or a motorboat, a gas such as helium or hydrogen may be filled in the high-altitude flight module 106, so that the level-1 over-the-air network node can float in the air. The level-1 over-the-air network node further includes the wireless routing module 107, to manage multiple level-2 over-the-air network nodes, and send, to the service processing device using the wireless routing module 107, service data reported by the managed level-2 over-the-air network node. The level-1 over-the-air network node may further include an image sensor, a positioning module, a gyroscope, various sensors configured to collect environmental data, and the like.

In the embodiments of this application, the level-2 over-the-air network node needs to communicate with the service processing device using the level-1 over-the-air network node managing the level-2 over-the-air network node. Therefore, the service data collected by the level-2 over-the-air network node needs to be sent to the service processing device using the level-1 over-the-air network node. The level-2 over-the-air network node may include modules such as a processor, a memory, a wireless transceiver module, a solar supply unit, and a high-altitude flight module. For a structure of the level-2 over-the-air network node, refer to a description in FIG. 1, and details are not described herein again. The level-2 over-the-air network node further includes an image sensor, a positioning module, a gyroscope, various sensors configured to collect environmental data, and the like. The wireless transceiver module in the level-2 over-the-air network node may support at least one wireless communications technology, for example, a satellite communications technology, a laser communications technology, a visible light communications technology, a mobile communications technology, a wireless communications technology, and a BLUETOOTH communications technology.

Figure 2:
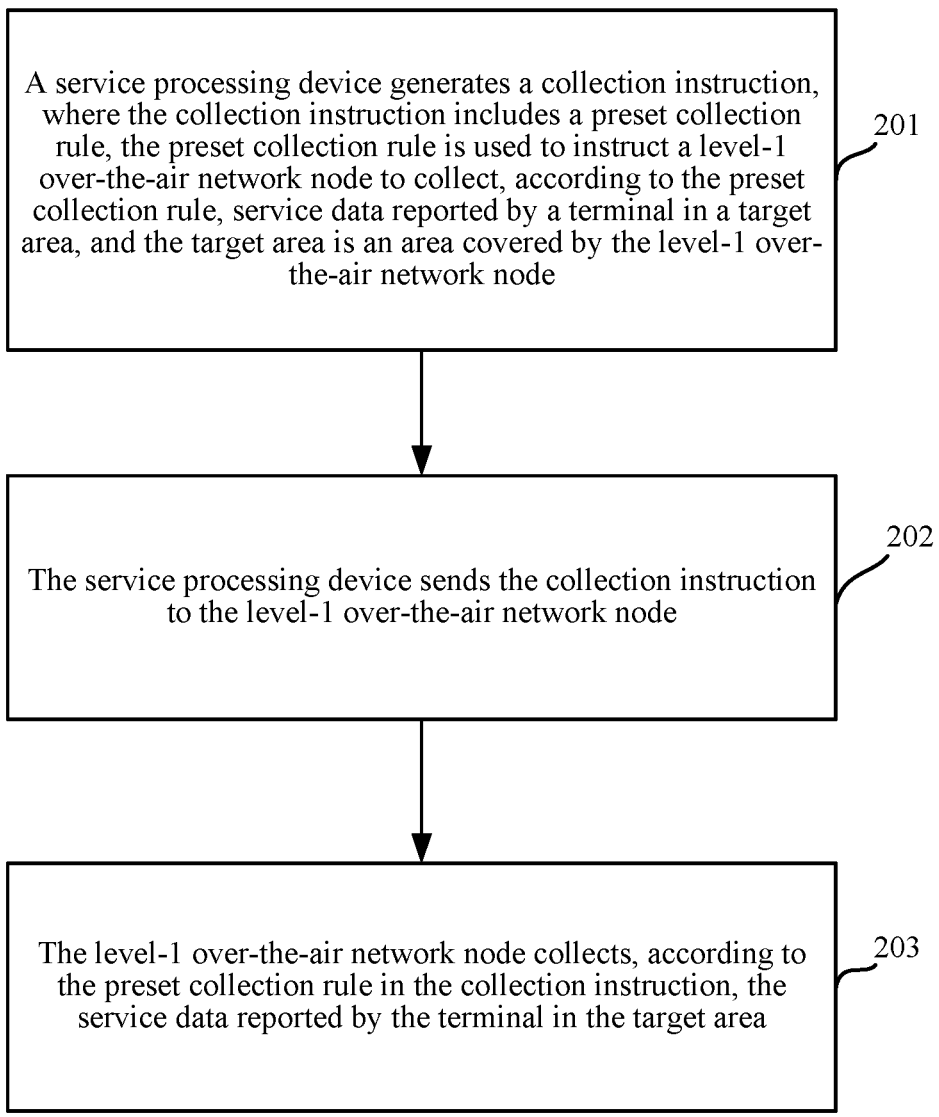
FIG. 2 is a schematic flowchart of a network communication method according to an embodiment of this application.

Based on the foregoing descriptions, as shown in FIG. 2, FIG. 2 is a schematic flowchart of a network communication method according to an embodiment of this application.

The method shown in FIG. 2 may be applied to an over-the-air network system, and the over-the-air network system includes a service processing device and a level-1 over-the-air network node.

Referring to FIG. 2, the method includes the following steps.

Step 201: The service processing device generates a collection instruction, where the collection instruction includes a preset collection rule, the preset collection rule is used to instruct the level-1 over-the-air network node to collect, according to the preset collection rule, service data reported by a terminal in a target area, and the target area is an area covered by the level-1 over-the-air network node.

Step 202: The service processing device sends the collection instruction to the level-1 over-the-air network node.

Step 203: The level-1 over-the-air network node collects, according to the preset collection rule in the collection instruction, the service data reported by the terminal in the target area.

In step 201, the preset collection rule in the collection instruction sent by the service processing device may have multiple forms, to instruct the level-1 over-the-air network node to collect service data according to different preset collection rules. The following gives detailed descriptions.

In a possible implementation, the preset collection rule includes a scanning location and a scanning height.

In this implementation, the service processing device may determine the scanning location and the scanning height according to a size of the target area and signal coverage of the level-1 over-the-air network node, so that after the level-1 over-the-air network node moves to the scanning location and the scanning height, a signal of the level-1 over-the-air network node can completely cover the target area. In this case, the level-1 over-the-air network node may stay at the scanning location and the scanning height, and collect the service data reported by the terminal in the target area.

Certainly, alternatively, when the service processing device needs to collect service data of a terminal that is in the target area and in which the service processing device is interested, the service processing device may determine a scanning location and a scanning height in the preset collection rule according to location information of the terminal in which the service processing device is interested, so that after moving to the scanning location and the scanning height, the level-1 over-the-air network node collects service data reported by the terminal that is in the target area and in which the service processing device is interested.

Figure 3:
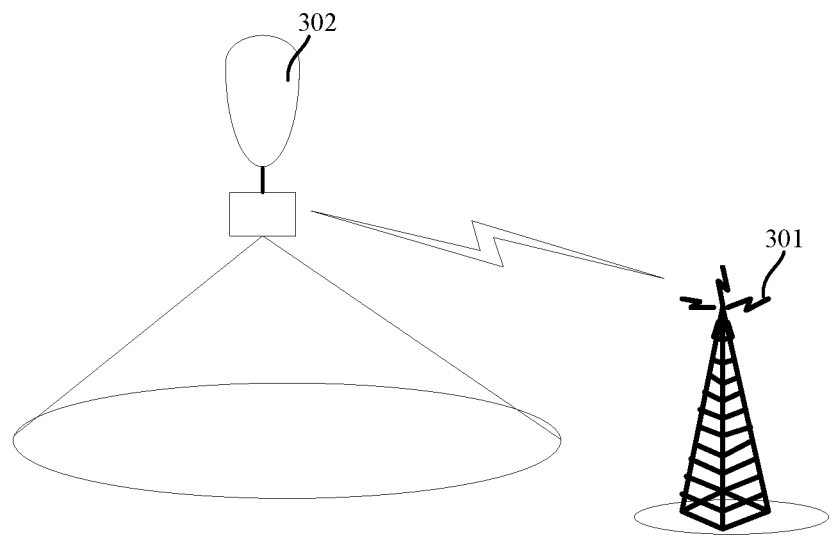
FIG. 3 is a schematic architectural diagram of an over-the-air network system according to an embodiment of this application.

For example, as shown in FIG. 3, FIG. 3 is a schematic architectural diagram of an over-the-air network system according to an embodiment of this application. FIG. 3 includes a service processing device 301 and a level-1 over-the-air network node 302. A target area can be completely covered by a signal of the level-1 over-the-air network node 302. The service processing device 301 determines, according to a size of the target area and signal coverage of the level-1 over-the-air network node, a scanning location and a scanning height at which the level-1 over-the-air network node 302 can completely cover the target area when the level-1 over-the-air network node 302 stays still; and sends, using a collection instruction, a preset collection rule including the scanning location and the scanning height to the level-1 over-the-air network node 302. After receiving the collection instruction, the level-1 over-the-air network node 302 moves to the scanning location and the scanning height, and collects service data reported by a terminal in the target area.

In a possible implementation, the preset collection rule includes a scanning route.

In this implementation, the service processing device may determine the scanning route according to a size of the target area and signal coverage of the level-1 over-the-air network node. The scanning route may be transverse scanning or longitudinal scanning. Alternatively, the scanning route may be in another form. A specific scanning route is determined according to an actual situation.

For example, the target area is a regular square area, and a size of the target area is greater than signal coverage of the level-1 over-the-air network node. In this case, the service processing device may determine that the scanning route is transverse scanning or longitudinal scanning, to instruct, using the scanning route in the preset collection rule, the level-1 over-the-air network node to transversely scan or longitudinally scan the target area.

Figure 4:
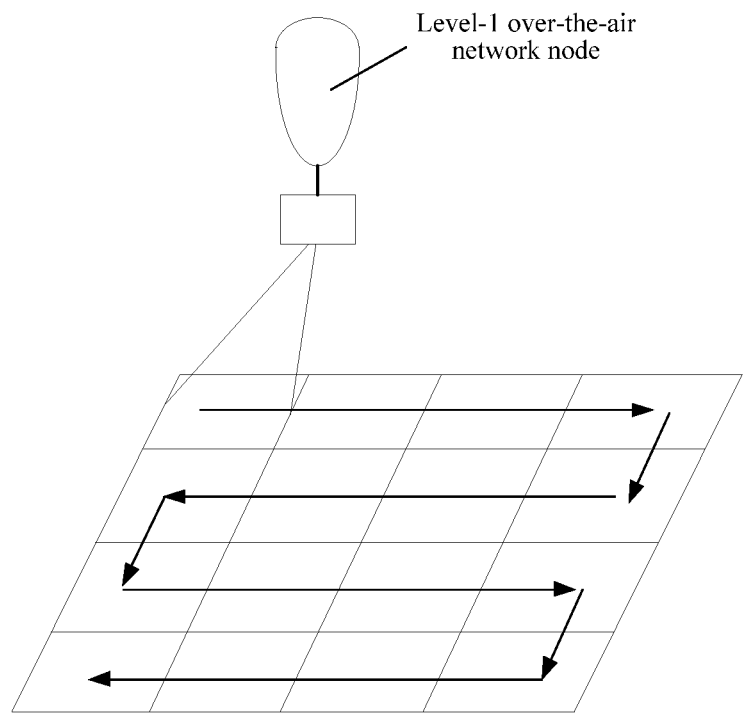
FIG. 4 is a schematic diagram of a scanning route according to an embodiment of this application.

For example, as shown in FIG. 4, FIG. 4 is a schematic diagram of a scanning route according to an embodiment of this application. In FIG. 4, the target area is a regular square area. The service processing device may determine that the scanning route is a transverse scanning route. In this case, the level-1 over-the-air network node may transversely scan the target area according to the scanning route in the preset collection rule.

For example, the target area is a highway between a site A and a site B. In this case, the scanning route may be a curve along the highway.

In this embodiment of this application, the scanning route in the preset collection rule may be location information of the route. The scanning route in the preset collection rule may alternatively be represented by an area code. Each area code corresponds to a sub-area in the target area. In this case, the service processing device divides the target area into multiple sub-areas, and sets a corresponding area code for each sub-area. When determining that service data reported by a terminal in the target area needs to be collected, the service device uses the area code as the scanning route and sends the area code to the level-1 over-the-air network node. The level-1 over-the-air network node scans the target area according to an order of area codes.

In a possible implementation, the preset collection rule may include a scanning time interval. The scanning time interval may be one hour, one day, or the like. A specific scanning time interval may be determined according to an actual situation.

In this implementation, the service processing device may instruct, using the preset collection rule in the collection instruction, the level-1 over-the-air network node to scan the target area according to the scanning time interval, and collect the service data reported by the terminal obtained by scanning.

Optionally, in a possible implementation, the preset collection rule may further include a scanning speed.

In this implementation, the service processing device may determine, according to a size of the target area, a bandwidth value of a communications link between the level-1 over-the-air network node and the terminal, a density of terminals in the target area, and a quantity of service data reported by each terminal, a speed at which the level-1 over-the-air network node scans the target area. The scanning speed determined by the service device needs to ensure that the level-1 over-the-air network node can collect all the service data reported by the terminal obtained by scanning, to avoid that the level-1 over-the-air network node cannot collect the service data in time because the scanning speed is too fast.

It should be noted that in this embodiment of this application, content included in the preset collection rule may be determined according to an actual situation. The preset collection rule may include all of the scanning route, the scanning location and the scanning height, the scanning time interval, and the scanning speed; or may include one or more of the foregoing. For example, the preset collection rule may include only the scanning route and the scanning time interval.

In step 202, the service processing device may send the collection instruction to the level-1 over-the-air network node using a communications link between the service processing device and the level-1 over-the-air network node. The communications link between the service processing device and the level-1 over-the-air network node may be an optical link, a radio frequency link, or the like. The optical link may be a communications link established using optical communication, for example, light emitting diode (LED) communication. The radio frequency link may be a communications link established using various communication protocols such as WIFI, Global System for Mobile Communications (GSM), Code Division Multiple Access (CDMA), Long Term Evolution (LTE), or Universal Mobile Telecommunications System (UMTS). For example, when WIFI communication is established between the service processing device and the level-1 over-the-air network node, the service processing device may send the collection instruction to the level-1 over-the-air network node using WIFI.

The service processing device may alternatively send the collection instruction to the level-1 over-the-air network node using a satellite. The service processing device sends the collection instruction to the satellite, and then the satellite forwards the received collection instruction to the level-1 over-the-air network node.

Figure 5:
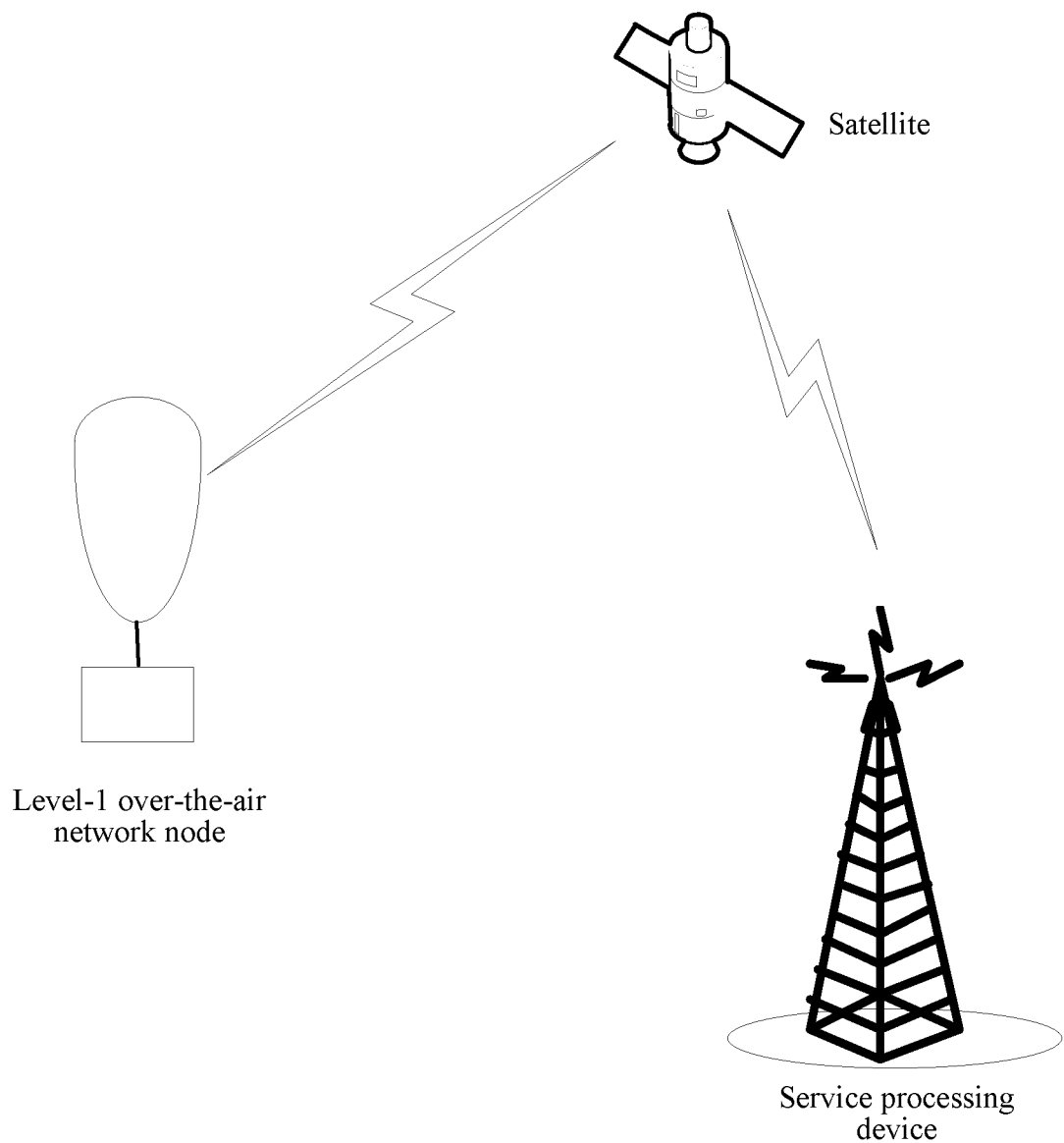
FIG. 5 is a schematic architectural diagram of an over-the-air network system according to an embodiment of this application.

For example, as shown in FIG. 5, FIG. 5 is a schematic architectural diagram of an over-the-air network system according to an embodiment of this application. In FIG. 5, the service processing device establishes a connection to a satellite, to send the collection instruction to the satellite. In addition, the level-1 over-the-air network node establishes a connection to the satellite, to receive the collection instruction forwarded by the satellite.

In step 203, the level-1 over-the-air network node may collect, according to the preset collection rule in the collection instruction, the service data reported by the terminal in the target area.

If the preset collection rule includes a scanning route, the level-1 over-the-air network node scans the target area according to the scanning route, and collects the service data reported by the terminal obtained by scanning. If the preset collection rule includes a scanning location and a scanning height, the level-1 over-the-air network node moves to the scanning location and the scanning height, scans the target area, and collects the service data reported by the terminal obtained by scanning. If the preset collection rule includes a scanning time interval, the level-1 over-the-air network node scans the target area according to the scanning time interval, and collects the service data reported by the terminal obtained by scanning. If the preset collection rule includes a scanning speed, the level-1 over-the-air network node scans the target area according to the scanning speed, and collects the service data reported by the terminal obtained by scanning.

In this embodiment of this application, the level-1 over-the-air network node may communicate with the terminal using a communications link such as a radio frequency link or an optical link. For specific content of the radio frequency link or the optical link, refer to the foregoing descriptions, and details are not described herein again.

When collecting the service data reported by the terminal, the level-1 over-the-air network node may collect the service data in a manner of broadcasting a paging request message. The level-1 over-the-air network node sends a paging request message to the terminal in a broadcast manner. After receiving the paging request message, the terminal sends a paging response message to the level-1 over-the-air network node. After receiving the paging response message, the level-1 over-the-air network node sends a service data report message to the terminal that sends the paging response message, so that the terminal reports the service data to the level-1 over-the-air network node according to the service data report message.

If the level-1 over-the-air network node has determined information such as location information of the terminal and identifier information of the terminal, the level-1 over-the-air network node may alternatively collect, in a point-to-point manner, the service data reported by the terminal. The level-1 over-the-air network node sends, according to the identifier information of the terminal, a paging request message to an area to which the location information of the terminal belongs. After receiving the paging request message, the terminal sends a paging response message to the level-1 over-the-air network node. After receiving the paging response message, the level-1 over-the-air network node sends a service data report message to the terminal that sends the paging response message, so that the terminal reports the service data to the level-1 over-the-air network node according to the service data report message.

In this embodiment of this application, to expand the signal coverage of the level-1 over-the-air network node, a rotary scanning module may further be added in the level-1 over-the-air network node. The rotary scanning module is configured to change a signal scanning direction by means of rotation, to expand the signal coverage.

Figure 6:
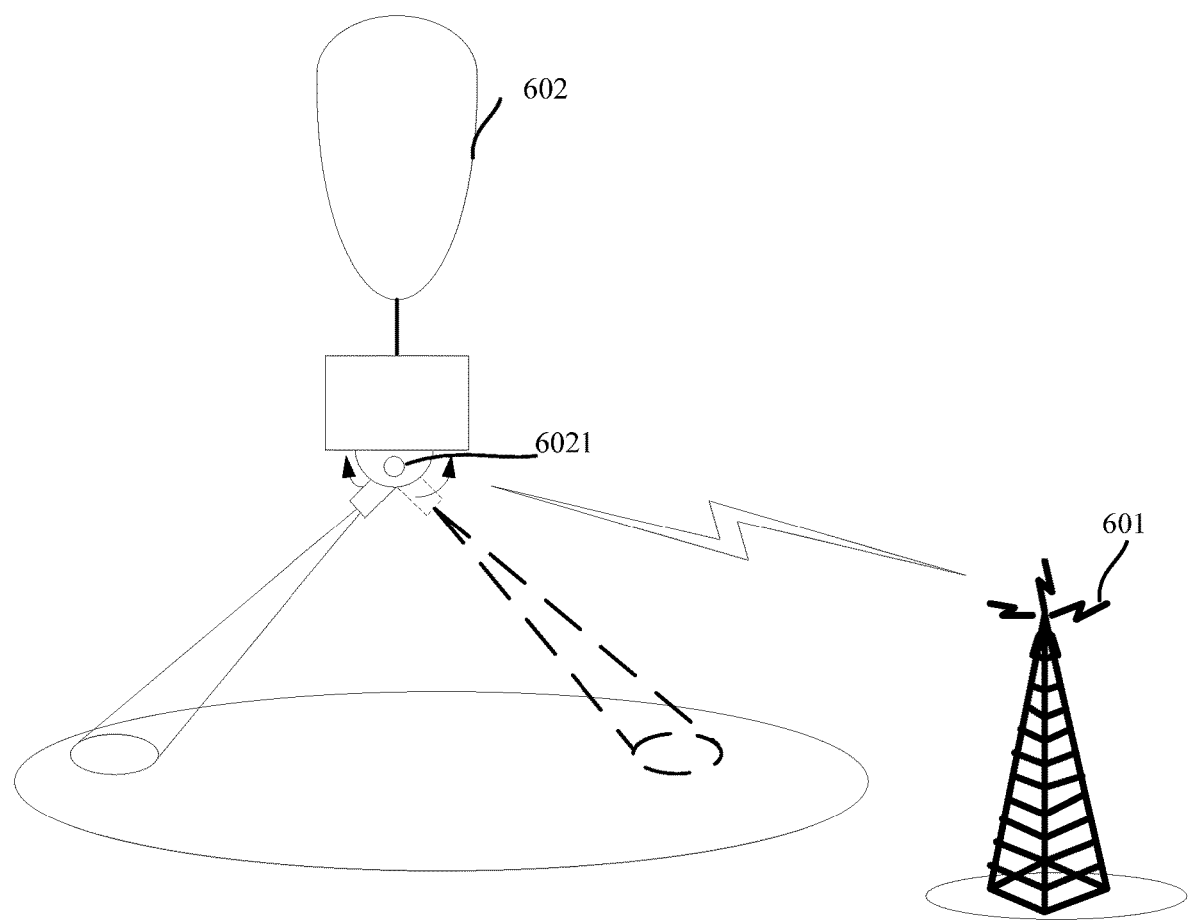
FIG. 6 is a schematic architectural diagram of an over-the-air network system according to an embodiment of this application.

As shown in FIG. 6, FIG. 6 is a schematic architectural diagram of an over-the-air network system according to an embodiment of this application. FIG. 6 includes a service processing device 601 and a level-1 over-the-air network node 602. The level-1 over-the-air network node 602 includes a rotary scanning module 6021. The rotary scanning module 6021 may change a signal scanning direction by means of rotation, to expand signal coverage.

In this embodiment of this application, after collecting service data reported by a terminal in a target area, the level-1 over-the-air network node further needs to send the collected service data to the service processing device, so that the service processing device performs an operation such as analysis or storage on the service data.

In a possible implementation, after collecting the service data reported by the terminal in the target area, the level-1 over-the-air network node may send a scanning complete acknowledgement message to the service processing device. After receiving the scanning complete acknowledgement message, the service processing device may determine that the level-1 over-the-air network node has collected the service data reported by the terminal in the target area. In this case, the service processing device may send a service data request message to the level-1 over-the-air network node, to instruct the level-1 over-the-air network node to send the service data to the service processing device. After receiving the service data request message, the level-1 over-the-air network node sends, to the service processing device according to the service data request message, the collected service data reported by the terminal in the target area.

It should be noted that in this embodiment of this application, each time after the level-1 over-the-air network node scans the target area, the level-1 over-the-air network node may send a scanning complete acknowledgement message to the service processing device. Alternatively, after scanning the target area for a preset quantity of times, the level-1 over-the-air network node may send a scanning complete acknowledgement message to the service processing device. For example, the preset quantity of times may be 5.

Figure 7:
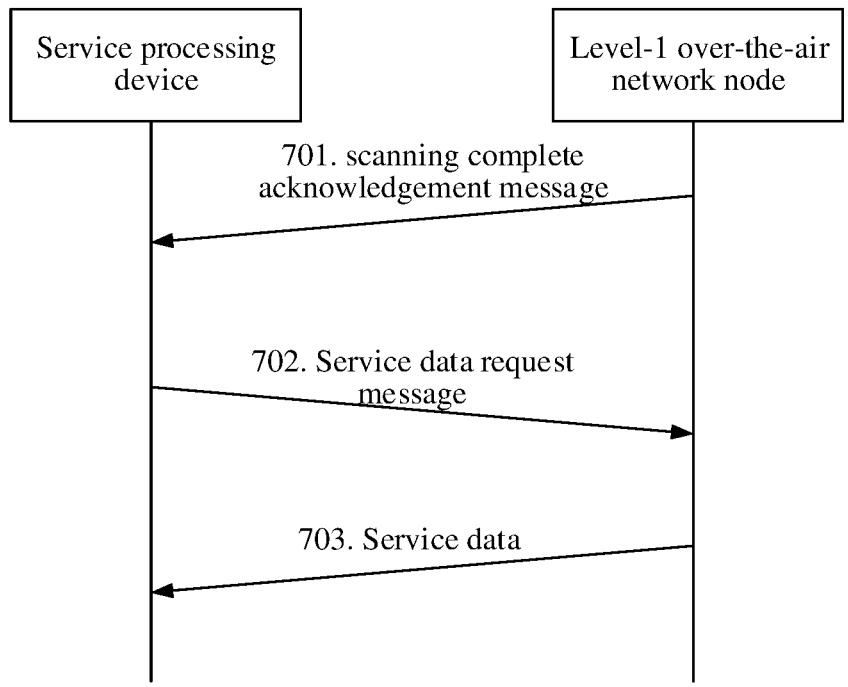
FIG. 7 is a schematic flowchart of obtaining service data according to an embodiment of this application.

For example, as shown in FIG. 7, FIG. 7 is a schematic flowchart of obtaining service data according to an embodiment of this application.

Step 701: After collecting service data reported by a terminal in a target area, a level-1 over-the-air network node sends a scanning complete acknowledgement message to a service processing device.

Step 702: The service processing device sends a service data request message to the level-1 over-the-air network node.

The service processing device may send the service data request message using a communications link between the service processing device and the level-1 over-the-air network node; or may send the service data request message to the level-1 over-the-air network node using a satellite.

Step 703: The level-1 over-the-air network node sends the collected service data to the service processing device according to the received service data request message.

In another possible implementation, when the service processing device needs service data, the service processing device sends a service data request message to the level-1 over-the-air network node. After receiving the service data request message, the level-1 over-the-air network node sends, to the service processing device according to the service data request message, collected service data reported by a terminal in a target area. It should be noted that in this implementation, after receiving the service data request message, the level-1 over-the-air network node may collect, in real time, the service data reported by the terminal, and send the collected service data to the service processing device.

Figure 8:
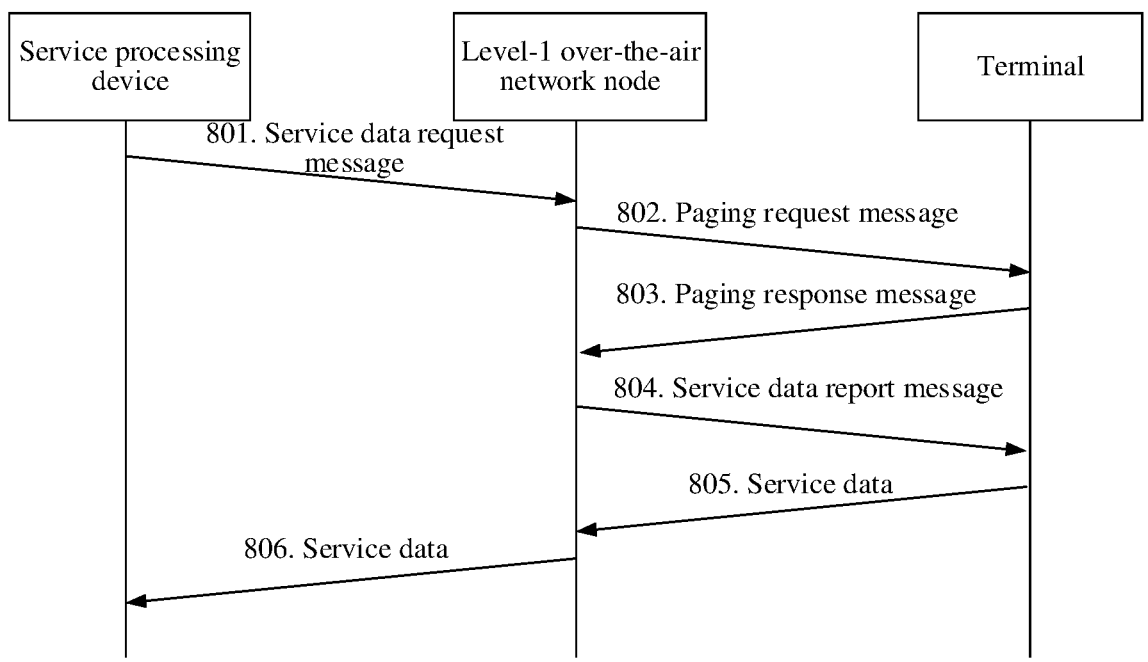
FIG. 8 is a schematic flowchart of obtaining service data according to an embodiment of this application.

For example, as shown in FIG. 8, FIG. 8 is a schematic flowchart of obtaining service data according to an embodiment of this application.

Step 801: A service processing device sends a service data request message to a level-1 over-the-air network node.

Step 802: After receiving the service data request message, the level-1 over-the-air network node scans a target area, and sends a paging request message to a terminal obtained by scanning.

Step 803: After receiving the paging request message, the terminal returns a paging response message to the level-1 over-the-air network node.

Step 804: After receiving the paging response message, the level-1 over-the-air network node sends a service data report message to the terminal.

Step 805: The terminal reports service data to the level-1 over-the-air network node according to the service data report message.

Step 806: The level-1 over-the-air network node forwards, to the service processing device, the service data reported by the terminal.

In this embodiment of this application, the service processing device may send the service data request message to the level-1 over-the-air network node using a communications link between the service processing device and the level-1 over-the-air network node. The service processing device may alternatively send the service data request message to the level-1 over-the-air network node using a satellite.

It should be noted that in this embodiment of this application, before sending the service data request message to the level-1 over-the-air network node, the service processing device may further determine, according to a link status of the communications link between the service processing device and the level-1 over-the-air network node, whether to send a movement control instruction to the level-1 over-the-air network node. If determining that the communications link between the service processing device and the level-1 over-the-air network node is in a disconnected state, the service processing device sends the movement control instruction to the level-1 over-the-air network node using a satellite. The service processing device instructs, using the movement control instruction, the level-1 over-the-air network node to move to a location whose distance to the service processing device is within a preset distance, and recover the communications link between the service processing device and the level-1 over-the-air network node. After determining that the level-1 over-the-air network node moves, according to the movement control instruction, to the location whose distance to the service processing device is within the preset distance and recovers the communications link, the service processing device sends the service data request message to the level-1 over-the-air network node using the communications link. The preset distance is a minimum value of a signal coverage radius of the service processing device and a signal coverage radius of the level-1 over-the-air network node.

Correspondingly, after moving, according to the movement control instruction, to the location whose distance to the service processing device is within the preset distance and recovering the communications link, the level-1 over-the-air network node sends, to the service processing device using the communications link, collected service data reported by the terminal in the target area.

By means of the foregoing method, it can be avoided that when the communications link between the service processing device and the level-1 over-the-air network node is in the disconnected state, the level-1 over-the-air network node sends the service data to the service processing device using a satellite may be avoided, thereby reducing a delay caused because the service data is sent using the satellite, and avoiding high costs generated because the service data is sent using the satellite.

Figure 9:
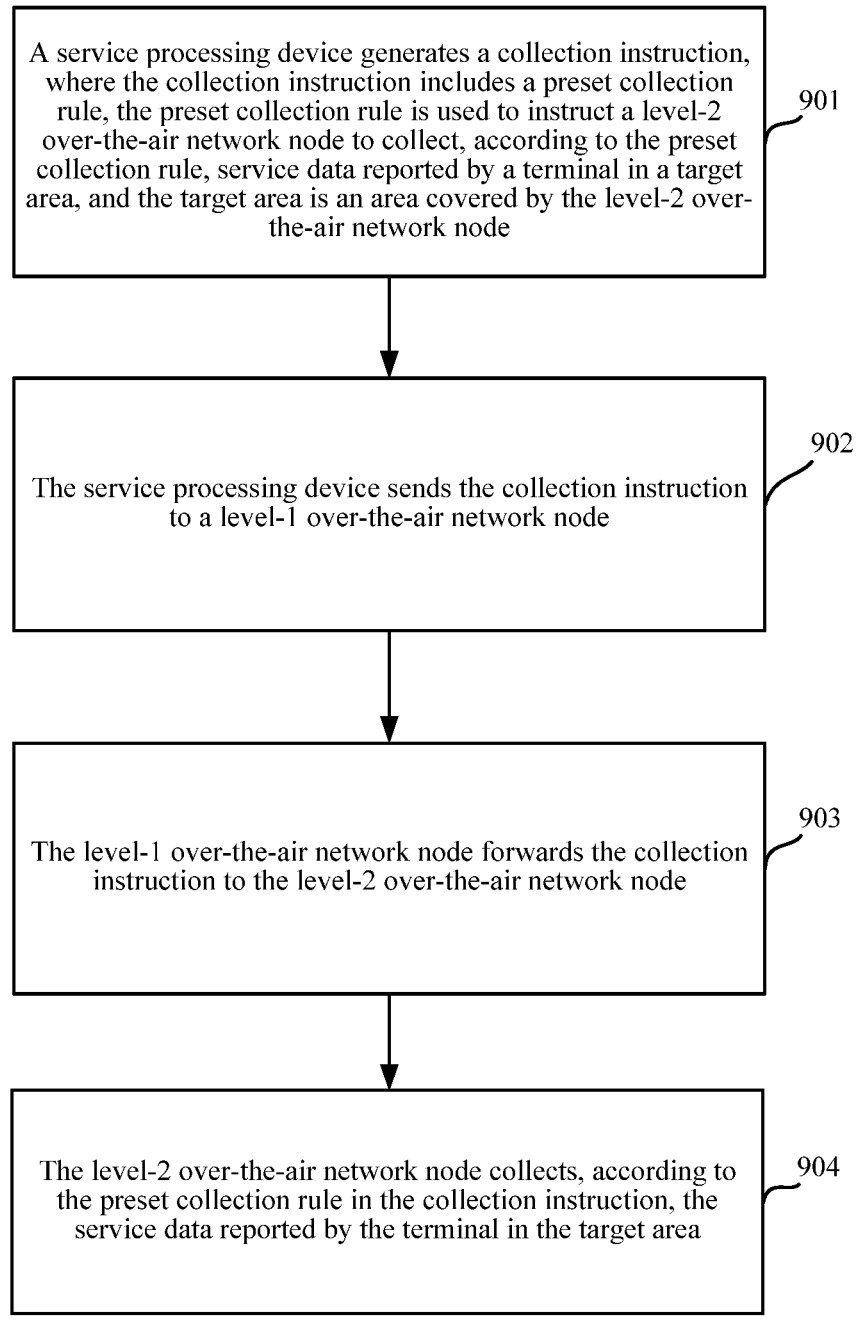
FIG. 9 is a schematic flowchart of a network communication method according to an embodiment of this application.

Based on the foregoing descriptions, as shown in FIG. 9, FIG. 9 is a schematic flowchart of a network communication method according to an embodiment of this application.

The method shown in FIG. 9 may be applied to an over-the-air network system, and the over-the-air network system includes a service processing device, a level-1 over-the-air network node, and a level-2 over-the-air network node.

Referring to FIG. 9, the method includes the following steps.

Step 901: The service processing device generates a collection instruction, where the collection instruction includes a preset collection rule, the preset collection rule is used to instruct the level-2 over-the-air network node to collect, according to the preset collection rule, service data reported by a terminal in a target area, and the target area is an area covered by the level-2 over-the-air network node.

Step 902: The service processing device sends the collection instruction to the level-1 over-the-air network node.

Step 903: The level-1 over-the-air network node forwards the collection instruction to the level-2 over-the-air network node.

Step 904: The level-2 over-the-air network node collects, according to the preset collection rule in the collection instruction, the service data reported by the terminal in the target area.

In step 901, the service processing device may determine, according to an actual situation, content included in the preset collection rule. The preset collection rule may include all of a scanning route, a scanning location and a scanning height, a scanning time interval, and a scanning speed; or may include one or more of the foregoing. For example, the preset collection rule may include only the scanning route and the scanning time interval. For detailed content of the preset collection rule, refer to a description in step 201, and details are not described herein again.

In step 902, the service processing device may send the collection instruction to the level-1 over-the-air network node using a communications link between the service processing device and the level-1 over-the-air network node. The service processing device may alternatively send the collection instruction to the level-1 over-the-air network node using a satellite. For details, refer to a description in step 202, and details are not described herein again.

In step 903, the level-1 over-the-air network node may send the collection instruction to the level-2 over-the-air network node using a communications link between the level-1 over-the-air network node and the level-2 over-the-air network node. The level-1 over-the-air network node may alternatively send the collection instruction to the level-2 over-the-air network node using a satellite.

For the collecting, by the level-2 over-the-air network node, the service data reported by the terminal in the target area in step 904, refer to a description in step 203, and details are not described herein again.

In this embodiment of this application, after collecting the service data reported by the terminal in the target area, the level-2 over-the-air network node further needs to send the collected service data to the service processing device, so that the service processing device performs an operation such as analysis or storage on the service data.

In a possible implementation, after collecting the service data reported by the terminal in the target area, the level-2 over-the-air network node may send a scanning complete acknowledgement message to the level-1 over-the-air network node. After receiving the scanning complete acknowledgement message, the level-1 over-the-air network node forwards the scanning complete acknowledgement message to the service processing device. After receiving the scanning complete acknowledgement message, the service processing device sends a service data request message to the level-1 over-the-air network node. After receiving the service data request message sent by the service processing device, the level-1 over-the-air network node forwards the service data request message to the level-2 over-the-air network node. The level-2 over-the-air network node receives the service data request message forwarded by the level-1 over-the-air network node; and sends, to the level-1 over-the-air network node according to the service data request message, the collected service data reported by the terminal in the target area, Then the level-1 over-the-air network node forwards the received service data to the service processing device.

It should be noted that in this embodiment of this application, each time after the level-2 over-the-air network node scans the target area, the level-2 over-the-air network node may send a scanning complete acknowledgement message to the service processing device. Alternatively, after scanning the target area for a preset quantity of times, the level-2 over-the-air network node may send a scanning complete acknowledgement message to the service processing device. For example, the preset quantity of times may be 5.

Figure 10:
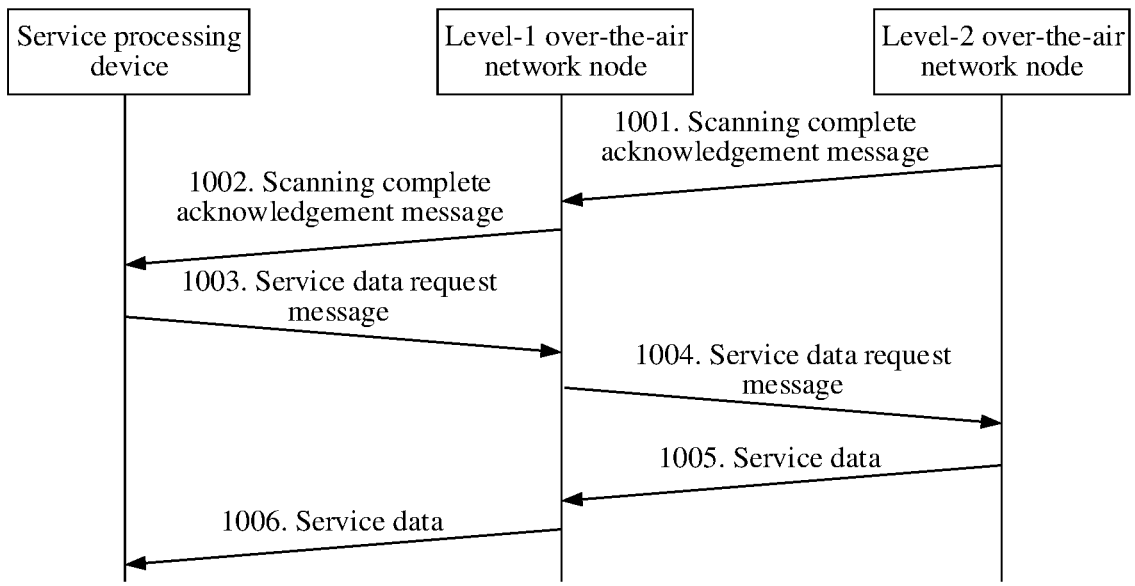
FIG. 10 is a schematic flowchart of obtaining service data according to an embodiment of this application.

For example, as shown in FIG. 10, FIG. 10 is a schematic flowchart of obtaining service data according to an embodiment of this application.

Step 1001: After collecting service data reported by a terminal in a target area, a level-2 over-the-air network node sends a scanning complete acknowledgement message to a level-1 over-the-air network node.

Step 1002: The level-1 over-the-air network node forwards the scanning complete acknowledgement message to a service processing device.

Step 1003: The service processing device sends a service data request message to the level-1 over-the-air network node.

The service processing device may send the service data request message using a communications link between the service processing device and the level-1 over-the-air network node; or may send the service data request message to the level-1 over-the-air network node using a satellite.

Step 1004: The level-1 over-the-air network node forwards the received service data request message to the level-2 over-the-air network node.

Step 1005: The level-2 over-the-air network node sends the collected service data to the level-1 over-the-air network node according to the received service data request message.

Step 1006: The level-1 over-the-air network node forwards the received service data to the level-2 over-the-air network node.

In another possible implementation, when the service processing device needs service data, the service processing device sends a service data request message to the level-2 over-the-air network node using the level-1 over-the-air network node. After receiving the service data request message, the level-2 over-the-air network node sends, to the service processing device using the level-1 over-the-air network node, collected service data reported by a terminal in a target area. It should be noted that in this implementation, after receiving the service data request message, the level-2 over-the-air network node may collect, in real time, the service data reported by the terminal, and send the collected service data to the service processing device.

Figure 11:
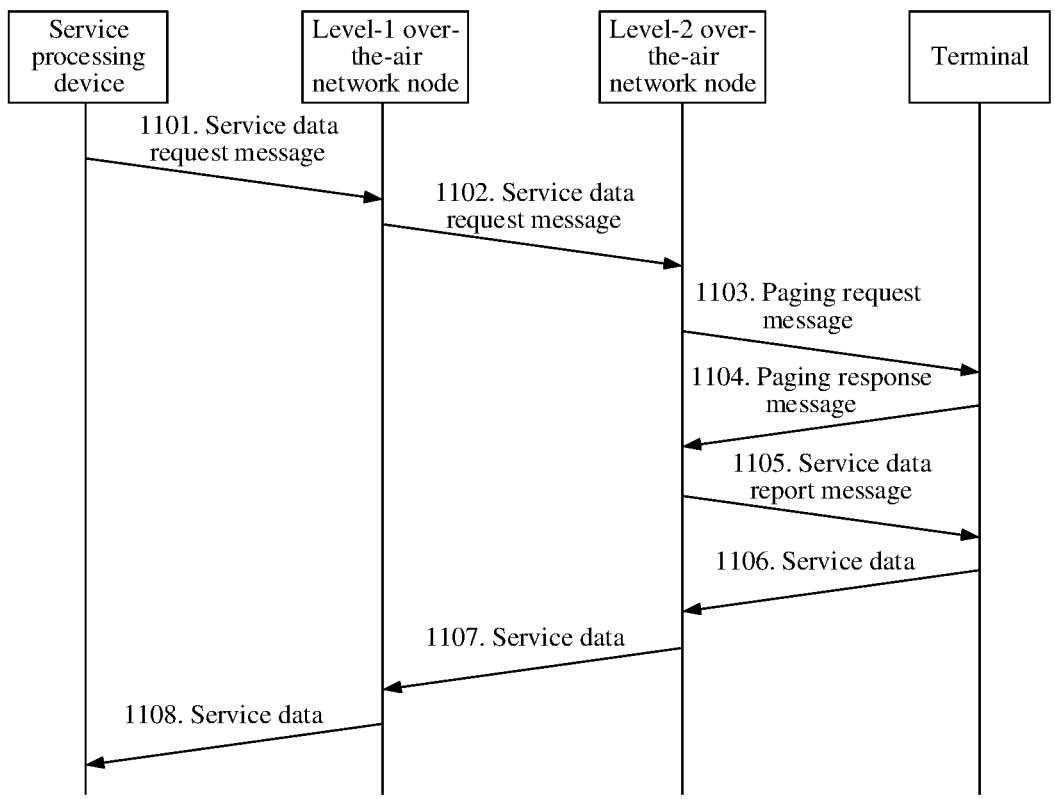
FIG. 11 is a schematic flowchart of obtaining service data according to an embodiment of this application.

For example, as shown in FIG. 11, FIG. 11 is a schematic flowchart of obtaining service data according to an embodiment of this application.

Step 1101: A service processing device sends a service data request message to a level-1 over-the-air network node.

The service processing device may send the service data request message using a communications link between the service processing device and the level-1 over-the-air network node; or may send the service data request message to the level-1 over-the-air network node using a satellite.

Step 1102: After receiving the service data request message, the level-1 over-the-air network node forwards the service data request message to a level-2 over-the-air network node.

Step 1103: After receiving the service data request message, the level-2 over-the-air network node scans a target area, and sends a paging request message to a terminal obtained by scanning.

Step 1104: After receiving the paging request message, the terminal returns a paging response message to the level-2 over-the-air network node.

Step 1105: After receiving the paging response message, the level-2 over-the-air network node sends a service data report message to the terminal.

Step 1106: The terminal reports service data to the level-2 over-the-air network node according to the service data report message.

Step 1107: The level-2 over-the-air network node forwards, to the level-1 over-the-air network node, the service data reported by the terminal.

Step 1108: The level-1 over-the-air network node forwards, to the service processing device, the service data reported by the level-2 over-the-air network node.

In this embodiment of this application, before forwarding the service data request message to the level-2 over-the-air network node, if determining that a communications link between the level-1 over-the-air network node and the level-2 over-the-air network node is in a disconnected state, the level-1 over-the-air network node moves to a location whose distance to the level-2 over-the-air network node is within a preset distance, and recovers the communications link between the level-1 over-the-air network node and the level-2 over-the-air network node. Then the level-1 over-the-air network node sends the service data request message to the level-2 over-the-air network node using the communications link. The preset distance is a minimum value of a signal coverage radius of the level-1 over-the-air network node and a signal coverage radius of the level-2 over-the-air network node.

Figure 12:
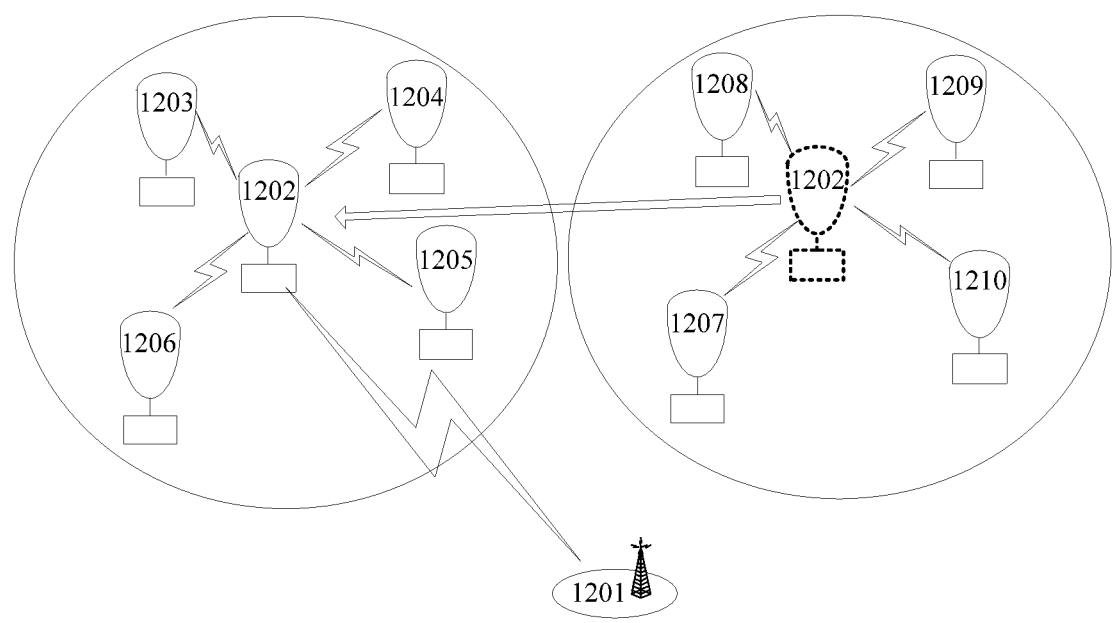
FIG. 12 is a schematic architectural diagram of an over-the-air network system according to an embodiment of this application.

For example, as shown in FIG. 12, FIG. 12 is a schematic architectural diagram of an over-the-air network system according to an embodiment of this application. FIG. 12 includes a service processing device 1201, a level-1 over-the-air network node 1202, and eight level-2 over-the-air network nodes 1203 to 1210. The level-2 over-the-air network nodes 1203 to 1210 access the level-1 over-the-air network node 1202, and send collected service data to the level-1 over-the-air network node 1202, and then the level-1 over-the-air network node 1202 forwards the service data to the service processing device 1201. The level-1 over-the-air network node 1202 may move between the level-2 over-the-air network nodes 1203 to 1210, to collect service data using communications links between the level-1 over-the-air network node and the level-2 over-the-air network nodes.

In the following embodiments, for ease of description, the level-1 over-the-air network node or the level-2 over-the-air network node is generally referred to as an over-the-air network node.

When a terminal reports service data, the terminal may report the service data using the over-the-air network node (the level-1 over-the-air network node or the level-2 over-the-air network node). When determining that a signal strength of the over-the-air network node is less than a threshold, the terminal starts a task of searching for a satellite and reports the service data using the found satellite, thereby achieving continuity of reporting service data. Currently, because there are many uncertain factors about a signal of the satellite, after starting the task of searching for a satellite, the terminal needs a relatively long time to determine an appropriate satellite for access. As a result, the terminal may be in an offline state for a long time. Consequently, system efficiency is decreased. To resolve the foregoing problem, an embodiment of this application provides a network communication method. The following gives detailed descriptions.

Figure 13:
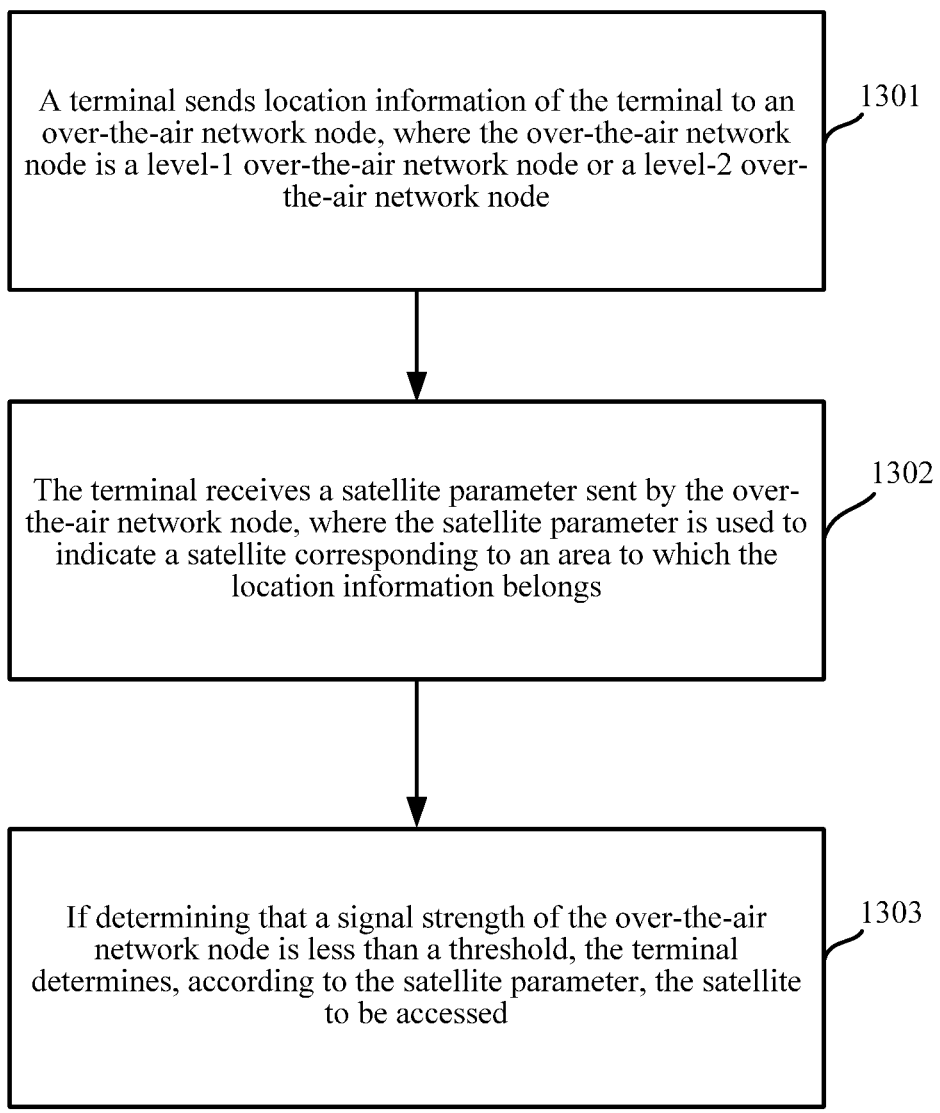
FIG. 13 is a schematic flowchart of a network communication method according to an embodiment of this application.

Based on the foregoing descriptions, as shown in FIG. 13, FIG. 13 is a schematic flowchart of a network communication method according to an embodiment of this application. The method includes the following steps.

Step 1301: A terminal sends location information of the terminal to an over-the-air network node, where the over-the-air network node is a level-1 over-the-air network node or a level-2 over-the-air network node.

Step 1302: The terminal receives a satellite parameter sent by the over-the-air network node, where the satellite parameter is used to indicate a satellite corresponding to an area to which the location information belongs.

Step 1303: If determining that a signal strength of the over-the-air network node is less than a threshold, the terminal determines, according to the satellite parameter, the satellite to be accessed.

In step 1301, the over-the-air network node may be a level-1 over-the-air network node or may be a level-2 over-the-air network node. For content such as a structure or a function of the level-1 over-the-air network node or the level-2 over-the-air network node, refer to the foregoing descriptions, and details are not described herein again.

In this embodiment of this application, when determining that a relative movement distance between the terminal and the over-the-air network node is greater than a preset distance threshold, the terminal may send the location information to the over-the-air network node. Alternatively, the terminal may periodically send the location information to the over-the-air network node.

It should be noted that in this embodiment of this application, the location information may be information such as latitude and longitude coordinates.

In step 1302, after receiving the location information sent by the terminal, the over-the-air network node determines, according to a detected satellite signal, all satellites whose signals cover the area to which the location information of the terminal belongs, and determines satellite parameters of all the satellites. The satellite parameter may include a satellite identifier, a signal strength, a satellite coverage area, a signal frequency, a bandwidth supported by a satellite, and the like. Then the over-the-air network node sends the determined satellite parameters of the satellites to the terminal.

After receiving the satellite parameters, the terminal may store the received satellite parameters. When the terminal needs to access a satellite, the terminal may determine, according to the satellite parameters, the satellite that needs to be accessed.

Finally, in step 1303, when determining that the signal strength of the over-the-air network node is less than a first threshold, the terminal may quickly start, according to the satellite parameter sent by the over-the-air network node, a task of searching for a satellite, and may be synchronous with a satellite network as soon as possible according to the satellite parameter sent by the over-the-air network node.

In this embodiment of this application, the terminal may select, by comprehensively considering factors such as the signal strength, the satellite coverage area, the signal frequency, the bandwidth supported by the satellite, and the like in the satellite parameter, a most appropriate satellite for access. Certainly, the terminal may alternatively select, according to only the signal strength and the satellite coverage area, a most appropriate satellite for access.

According to the method provided in this embodiment of this application, when determining that a signal strength of the over-the-air network node is less than the threshold, the terminal may directly determine, according to the satellite parameter sent by the over-the-air network node, the satellite to be accessed, to avoid a communications delay caused because the terminal actively searches for satellites and selects the satellite that needs to be accessed, thereby increasing a network access speed of the terminal and improving system efficiency.

Based on a same technical concept, an embodiment of this application further provides a network communications apparatus, and the apparatus can perform the foregoing method embodiments.

Figure 14:
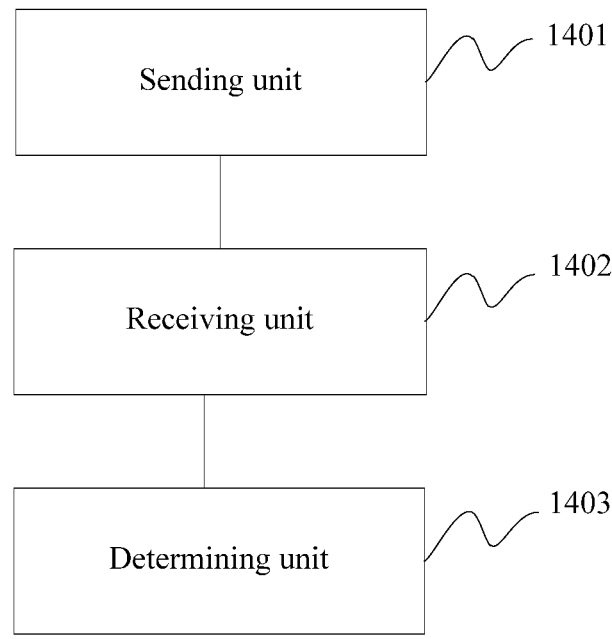
FIG. 14 is a schematic structural diagram of a network communications apparatus according to an embodiment of this application.

As shown in FIG. 14, FIG. 14 is a schematic structural diagram of a network communications apparatus according to an embodiment of this application. The apparatus is applied to an over-the-air network system, and the over-the-air network system includes a terminal and an over-the-air network node.

Referring to FIG. 14, the apparatus includes a sending unit 1401 configured to send location information of the terminal to the over-the-air network node, where the over-the-air network node is a level-1 over-the-air network node or a level-2 over-the-air network node; a receiving unit 1402 configured to receive a satellite parameter sent by the over-the-air network node, where the satellite parameter is used to indicate a satellite corresponding to an area to which the location information belongs; and a determining unit 1403 configured to if determining that a signal strength of the over-the-air network node is less than a threshold, determine, according to the satellite parameter, the satellite to be accessed.

Optionally, the sending unit 1401 is configured to when determining that a relative movement distance between the terminal and the over-the-air network node is greater than a preset distance threshold, send the location information to the over-the-air network node; or periodically send the location information to the over-the-air network node.

Based on a same technical concept, an embodiment of this application further provides a network communications apparatus, and the apparatus can perform the foregoing method embodiments.

Figure 15:
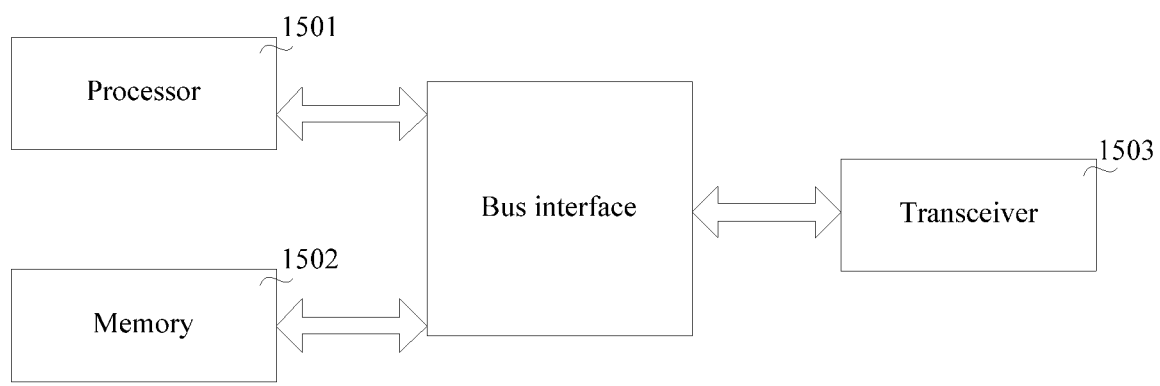
FIG. 15 is a schematic structural diagram of a network communications apparatus according to an embodiment of this application.

As shown in FIG. 15, FIG. 15 is a schematic structural diagram of a network communications apparatus according to an embodiment of this application. The apparatus is applied to an over-the-air network system, and the over-the-air network system includes a terminal and an over-the-air network node.

Referring to FIG. 15, the apparatus includes a processor 1501, a memory 1502, and a transceiver 1503.

The transceiver 1503 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor 1501 may be a central processing unit (CPU), a network processor (NP), or a combination of the CPU and the NP. The processor 1501 may further include a hardware chip. The foregoing hardware chip may be an application-specific integrated circuit (ASIC), a programmable logic device (PLD), or a combination thereof. The foregoing PLD may be a complex programmable logical device (CPLD), a field programmable gate array (FPGA), a generic array logic (GAL), or a combination thereof. The memory 1502 may include a volatile memory, for example, a random-access memory (RAM). The memory 1502 may further include a non-volatile memory, for example, a read-only memory (ROM), a flash memory, a hard disk drive (HDD), or a solid-state drive (SSD). The memory may further include a combination of the foregoing memories.

The transceiver 1503 is configured to send location information of the terminal to the over-the-air network node, where the over-the-air network node is a level-1 over-the-air network node or a level-2 over-the-air network node; and receive a satellite parameter sent by the over-the-air network node, where the satellite parameter is used to indicate a satellite corresponding to an area to which the location information belongs.

The memory 1502 is configured to store a computer program.

The processor 1501 is configured to execute the computer program stored in the memory 1502, to perform the following operation if determining that a signal strength of the over-the-air network node is less than a threshold, determining, according to the satellite parameter, the satellite to be accessed.

Optionally, the transceiver 1503 is configured to when determining that a relative movement distance between the terminal and the over-the-air network node is greater than a preset distance threshold, send the location information to the over-the-air network node; or periodically send the location information to the over-the-air network node.

FIG. 15 may further include a bus interface. The bus interface may include any quantity of interconnected buses and bridges. The buses and the bridges link various circuits of one or more processors represented by the processor and a memory represented by the memory. The bus interface may further link various other circuits of a peripheral device, a voltage stabilizer, a power management circuit, and the like. These are known in the art. Therefore, no details are further described in this specification. The bus interface provides an interface. The transceiver provides a unit configured to communicate with various other devices using a transmission medium. The processor is responsible for bus architecture management and general processing. The memory may store data used by the processor when the processor performs an operation.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some embodiments of the present application have been described, persons skilled in the art can make changes and modifications to these embodiments once they learn the basic inventive concept. Therefore, the following claims are intended to be construed as to cover the preferred embodiments and all changes and modifications falling within the scope of the present application.

Obviously, persons skilled in the art can make various modifications and variations to this application without departing from the scope of this application. This application is intended to cover these modifications and variations of this application provided that they fall within the scope of protection defined by the following claims.

What is claimed is:

1. A network communication method, wherein the method is applied to an over-the-air network system, wherein the over-the-air network system comprises a service processing device and a level-1 over-the-air network node, and wherein the method comprises:

generating, by the service processing device, a collection instruction, wherein the collection instruction comprises a preset collection rule, wherein the preset collection rule instructs the level-1 over-the-air network node to collect, according to the preset collection rule, service data from a terminal in a target area, and wherein the target area is an area covered by the level-1 over-the-air network node;

sending, by the service processing device, the collection instruction to the level-1 over-the-air network node;

collecting, by the level-1 over-the-air network node according to the preset collection rule in the collection instruction, the service data from the terminal in the target area;

sending, by the level-1 over-the-air network node, a scanning complete acknowledgement message to the service processing device, to indicate, to the service processing device, that the level-1 over-the-air network node has collected the service data from the terminal in the target area;

sending, by the service processing device, a service data request message to the level-1 over-the-air network node, to instruct the level-1 over-the-air network node to send the service data to the service processing device after receiving the scanning complete acknowledgement message; and sending, to the service processing device according to the service data request message, the collected service data from the terminal in the target area.

2. The network communication method of claim 1, wherein the preset collection rule comprises a scanning route, and wherein collecting, by the level-1 over-the-air network node according to the preset collection rule in the collection instruction, the service data from the terminal in the target area comprises:

scanning, by the level-1 over-the-air network node, the target area according to the scanning route; and collecting the service data from the terminal obtained by scanning.

3. The network communication method of claim 1, wherein the preset collection rule comprises a scanning location and a scanning height, and wherein collecting, by the level-1 over-the-air network node according to the preset collection rule in the collection instruction, the service data from the terminal in the target area comprises:

moving, by the level-1 over-the-air network node, to the scanning location and the scanning height; and scanning the target area and collecting the service data from the terminal obtained by scanning.

4. The network communication method of claim 1, wherein the preset collection rule comprises a scanning time interval, and wherein collecting, by the level-1 over-the-air network node according to the preset collection rule in the collection instruction, the service data from the terminal in the target area comprises:

scanning, by the level-1 over-the-air network node, the target area according to the scanning time interval; and collecting the service data from the terminal obtained by scanning.

5. The network communication method of claim 1, wherein sending, by the service processing device, the service data request message to the level-1 over-the-air network node comprises:

sending, by the service processing device, a movement control instruction to the level-1 over-the-air network node using a satellite when determining that a communications link between the service processing device and the level-1 over-the-air network node is in a disconnected state, wherein the movement control instruction instructs the level-1 over-the-air network node to move to a location whose distance to the service processing device is within a preset distance, and recover the communications link between the service processing device and the level-1 over-the-air network node; and sending, by the service processing device, the service data request message to the level-1 over-the-air network node using the communications link after determining that the level-1 over-the-air network node moves, according to the movement control instruction, to the location whose distance to the service processing device is within the preset distance and recovers the communications link, wherein the preset distance is a minimum value of a signal coverage radius of the service processing device and a signal coverage radius of the level-1 over-the-air network node, and wherein sending, by the level-1 over-the-air network node to the service processing device according to the service data request message, the collected service data from the terminal in the target area comprises sending, by the level-1 over-the-air network node to the service processing device using the communications link, the collected service data from the terminal in the target area.

6. The network communication method of claim 1, wherein the preset collection rule comprises a scanning speed.

7. The network communication method of claim 1, wherein the level-1 over-the-air network node comprises an image sensor, a positioning module, or a gyroscope.

8. A network communication method, wherein the method is applied to an over-the-air network system, wherein the over-the-air network system comprises a service processing device, a level-1 over-the-air network node, and a level-2 over-the-air network node, and wherein the method comprises:

generating, by the service processing device, a collection instruction, wherein the collection instruction comprises a preset collection rule, wherein the preset collection rule instructs the level-2 over-the-air network node to collect, according to the preset collection rule, service data from a terminal in a target area, and wherein the target area is an area covered by the level-2 over-the-air network node;

sending, by the service processing device, the collection instruction to the level-1 over-the-air network node;

forwarding, by the level-1 over-the-air network node, the collection instruction to the level-2 over-the-air network node;

collecting, by the level-2 over-the-air network node according to the preset collection rule in the collection instruction, the service data from the terminal in the target area;

sending, by the level-2 over-the-air network node, a scanning complete acknowledgement message to the level-1 over-the-air network node, wherein the scanning complete acknowledgement message indicates, to the service processing device, that the level-2 over-the-air network node has collected the service data from the terminal in the target area;

forwarding the scanning complete acknowledgement message to the service processing device;

sending, by the service processing device, a service data request message to the level-1 over-the-air network node after the service processing device receives the scanning complete acknowledgement message, wherein the service data request message instructs the level-2 over-the-air network node to send the service data to the service processing device;

receiving, by the level-1 over-the-air network node, the service data request message from the service processing device;

forwarding the service data request message to the level-2 over-the-air network node;

receiving, by the level-2 over-the-air network node, the service data request message forwarded by the level-1 over-the-air network node; and sending, to the service processing device according to the service data request message using the level-1 overthe-air network node, the collected service data from the terminal in the target area.

9. The network communication method of claim 8, wherein the preset collection rule comprises a scanning route, and wherein collecting, by the level-2 over-the-air network node according to the preset collection rule in the collection instruction, the service data from the terminal in the target area comprises:

scanning, by the level-2 over-the-air network node, the target area according to the scanning route; and collecting the service data from the terminal obtained by scanning.

10. The network communication method of claim 8, wherein the preset collection rule comprises a scanning location and a scanning height, and wherein collecting, by the level-2 over-the-air network node according to the preset collection rule in the collection instruction, the service data from the terminal in the target area comprises:

moving, by the level-2 over-the-air network node, to the scanning location and the scanning height; and scanning the target area and collecting the service data from the terminal obtained by scanning.

11. The network communication method of claim 8, wherein the preset collection rule comprises a scanning time interval, and wherein collecting, by the level-2 over-the-air network node according to the preset collection rule in the collection instruction, the service data from the terminal in the target area comprises:

scanning, by the level-2 over-the-air network node, the target area according to the scanning time interval; and collecting the service data from the terminal obtained by scanning.

12. The network communication method of claim 8, wherein forwarding, by the level-1 over-the-air network node, the service data request message to the level-2 over-the-air network node comprises:

moving, by the level-1 over-the-air network node, to a location whose distance to the level-2 over-the-air network node is within a preset distance, and recovering the communications link between the level-1 over-the-air network node and the level-2 over-the-air network node when determining that a communications link between the level-1 over-the-air network node and the level-2 over-the-air network node is in a disconnected state; and sending, by the level-1 over-the-air network node, the service data request message to the level-2 over-the-air network node using the communications link, wherein the preset distance is a minimum value of a signal coverage radius of the level-1 over-the-air network node and a signal coverage radius of the level-2 over-the-air network node, and wherein sending, by the level-2 over-the-air network node to the service processing device according to the service data request message using the level-1 over-the-air network node, the collected service data from the terminal in the target area comprises:

sending, by the level-2 over-the-air network node to the level-1 over-the-air network node using the communications link, the collected service data from the terminal in the target area;

receiving, by the level-1 over-the-air network node, the service data from the terminal in the target area and from the level-2 over-the-air network node;

forwarding, to the service processing device, the service data from the terminal in the target area; and receiving, by the service processing device, the service data from the terminal in the target area and from the level-1 over-the-air network node.

13. The network communication method of claim 8, wherein the preset collection rule comprises a scanning speed.

14. The network communication method of claim 8, wherein the level-1 over-the-air network node comprises an image sensor, a positioning module, or a gyroscope.

15. A network communication method, wherein the method is applied to an over-the-air network system, wherein the over-the-air network system comprises a terminal and an over-the-air network node, and wherein the method comprises:

sending, by the terminal, location information of the terminal to the over-the-air network node, the over-the-air network node being a level-1 over-the-air network node or a level-2 over-the-air network node;

receiving, by the terminal, a satellite parameter from the over-the-air network node, wherein the satellite parameter indicates a satellite corresponding to an area to which the location information belongs; and determining, by the terminal according to the satellite parameter, the satellite to be accessed when determining that a signal strength of the over-the-air network node is less than a threshold.

16. The network communication method of claim 15, wherein sending, by the terminal, the location information to the over-the-air network node comprises sending, by the terminal, the location information to the over-the-air network node when determining that a relative movement distance between the terminal and the over-the-air network node is greater than a preset distance threshold.

17. The network communication method of claim 15, wherein sending, by the terminal, the location information to the over-the-air network node comprises periodically sending, by the terminal, the location information to the over-the-air network node.

18. A network communications apparatus, wherein the apparatus is applied to an over-the-air network system, wherein the over-the-air network system comprises a terminal and an over-the-air network node, and wherein the apparatus comprises:

a transceiver configured to:

send location information of the terminal to the over-the-air network node, wherein the over-the-air network node is a level-1 over-the-air network node or a level-2 over-the-air network node; and receive a satellite parameter from the over-the-air network node, wherein the satellite parameter indicates a satellite corresponding to an area to which the location information belongs; and a processor configured to determine, according to the satellite parameter, the satellite to be accessed when determining that a signal strength of the over-the-air network node is less than a threshold.

19. The network communication apparatus according to claim 18, wherein the transceiver is configured to send the location information to the over-the-air network node when determining that a relative movement distance between the terminal and the over-the-air network node is greater than a preset distance threshold.

20. The network communication apparatus of claim 18, wherein the transceiver is configured to periodically send the location information to the over-the-air network node.

* * * * *